United States Patent
Bosch et al.

(10) Patent No.: US 12,033,010 B2
(45) Date of Patent: Jul. 9, 2024

(54) SYSTEMS AND METHODS FOR EMBEDDING SERVICE MESHES INTO APPLICATIONS

(71) Applicant: Cisco Technology, Inc., San Jose, CA (US)

(72) Inventors: Hendrikus G. P. Bosch, Aalsmeer (NL); Jeffrey M. Napper, Delft (NL); Zsolt Varga, Budapest (HU); Nándor István Krácser, Aszód (HU); Krisztián Gacsal, Gyömrő (HU)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/309,194

(22) Filed: Apr. 28, 2023

(65) Prior Publication Data
US 2024/0134725 A1    Apr. 25, 2024

Related U.S. Application Data

(60) Provisional application No. 63/380,874, filed on Oct. 25, 2022.

(51) Int. Cl.
*H04L 65/00* (2022.01)
*G06F 9/54* (2006.01)

(52) U.S. Cl.
CPC .............. *G06F 9/547* (2013.01); *H04L 65/00* (2013.01)

(58) Field of Classification Search
CPC ...................................... G06F 9/547
USPC .......................................................... 709/203
See application file for complete search history.

(56) References Cited

U.S. PATENT DOCUMENTS

| | | | |
|---|---|---|---|
| 10,558,824 B1 * | 2/2020 | Remington | H04L 67/02 |
| 10,764,244 B1 | 9/2020 | Mestery et al. | |
| 2020/0272324 A1 * | 8/2020 | Chanda | G06F 3/04883 |
| 2021/0124822 A1 | 4/2021 | Tiwary et al. | |
| 2021/0374293 A1 * | 12/2021 | Bartling | G06F 3/0679 |
| 2022/0083364 A1 | 3/2022 | Jain | |
| 2022/0121470 A1 | 4/2022 | Saxena et al. | |
| 2022/0294866 A1 * | 9/2022 | Brocato | H04L 67/02 |
| 2022/0295117 A1 * | 9/2022 | Brocato | H04L 67/5682 |
| 2023/0100873 A1 * | 3/2023 | Galli | G06F 9/5016 718/104 |

OTHER PUBLICATIONS

Maxval No. 1003.SE20230306; Pre-Filing Search Report "Systems and Methods for a WASM-Based Service Mesh," dated Mar. 6, 2023, 42 pages.
Michael Yuan, "Cloud-native WebAssembly in Service Mesh," published in Wasm; dated Oct. 11, 2021, 3 pages.

* cited by examiner

*Primary Examiner* — Karen C Tang
(74) *Attorney, Agent, or Firm* — Baker Botts L.L.P.

(57) ABSTRACT

In one embodiment, a method includes generating an application stack. The application stack includes an application logic module. The method also includes embedding a service mesh module into the application stack. The method further includes managing, by the service mesh module, security of a network packet while maintaining separation of memory regions between the application logic module and the service mesh module.

20 Claims, 4 Drawing Sheets

SYSTEMS AND METHODS FOR EMBEDDING SERVICE MESHES INTO APPLICATIONS

CROSS-REFERENCE TO RELATED APPLICATIONS

[1] This application claims benefit of U.S. Provisional Patent Application No. 63/380,874 filed Oct. 25, 2022, by Hendrikus G. P. Bosch et al, and entitled "SYSTEMS AND METHODS FOR A WASM-BASED SERVICE MESH," which is incorporated herein by reference as if reproduced in its entirety.

TECHNICAL FIELD

The present disclosure relates generally to application security, and more specifically to systems and methods for embedding service meshes into applications.

BACKGROUND

With the accelerating demand for digital transformation, businesses are increasingly adopting cloud-native architectures. Microservice-based applications are created with software functionality spread across multiple services that are independently deployable, easier to maintain and test, and can be more rapidly updated. As these services scale, however, microservices application architectures quickly become complex, often running across multiple clusters both on premises and in the cloud. To manage this complexity, customers rely on a service mesh such as Istio. Istio uses the sidecar pattern, meaning that each application container has a sidecar Envoy proxy container running beside it in the same pod. However, the sidecar approach makes it difficult to deploy Envoy reliably, and customers find the use of such sidecars cumbersome.

DESCRIPTION OF EXAMPLE EMBODIMENTS

Overview

According to an embodiment, a system includes one or more processors and one or more computer-readable non-transitory storage media coupled to the one or more processors and including instructions that, when executed by the one or more processors, cause the system to perform operations. The operations include generating an application stack. The application stack includes an application logic module. The operations also include embedding a service mesh module into the application stack. The operations further include managing, by the service mesh module, security of a network packet while maintaining separation of memory regions between the application logic module and the service mesh module.

In certain embodiments, the application stack includes an application platform module. In some embodiments, the application platform module, the application logic module, and/or the service mesh module are WebAssembly (WASM)-based modules.

In certain embodiments, the application stack includes legacy libraries. In some embodiments, the service mesh module is run in a security enclave. In certain embodiments, the operations include initiating, by the service mesh module, a command-and-control center to activate an internal process that connects into a control plane.

In some embodiments, the application logic module is managed by a developer and/or the service mesh module is managed by security personnel. In certain embodiments, the developer and the security personnel are associated with different entities. In some embodiments, the application stack is hosted on an operating system. In certain embodiments, a browser is leveraged as the operating system.

According to another embodiment, a method includes generating an application stack. The application stack includes an application logic module. The method also includes embedding a service mesh module into the application stack. The method further includes managing, by the service mesh module, security of a network packet while maintaining separation of memory regions between the application logic module and the service mesh module.

According to yet another embodiment, one or more computer-readable non-transitory storage media embody instructions that, when executed by a processor, cause the processor to perform operations. The operations include generating an application stack. The application stack includes an application logic module. The operations also include embedding a service mesh module into the application stack. The operations further include managing, by the service mesh module, security of a network packet while maintaining separation of memory regions between the application logic module and the service mesh module.

Technical advantages of certain embodiments of this disclosure may include one or more of the following. Certain embodiments of this disclosure insert service mesh functionality directly into applications. An external process is replaced and used for managing the security aspects of message transmission between processes, with WASM and/or security enclaves. This reduces the complexity of hosting applications with an Istio control plane and makes using service meshes in applications more palatable with less friction.

Certain embodiments of this disclosure implement an application's built-in sidecar in a Web-assembly system interface (WASI). This programming paradigm further segregates and hardens the delivery of the built-in sidecar when deployed in the security enclaves and/or deployed natively in a WASM-only application.

In certain embodiments described herein, network packets are sent directly from WASM-based application logic into embedded WASM-based service meshes. As such, no inter-process communication between the application process and sidecar is needed as the sidecar is already part of the application itself. This may save the inter-process communication delays when sending and/or receiving packets, save a decrypt/re-encrypt cycle, and no man-in-the-middle functions are needed to enable sidecar to decrypt messages.

In some embodiments described herein, WASM ensures memory segregation between the individual WASM components of WASM-based application. However, if there are legacy libraries that are part of WASM-based application and these applications are compromised through known or unknown vulnerabilities, the secrets embedded in the service mesh module may be at risk. Certain embodiments described herein mitigate this threat by running the service mesh in a security enclave.

Certain embodiments of this disclosure address current service-mesh deployment and configuration issues. Certain embodiments described herein integrate processor security enclaves into an application and rid the system of the sidecar process. The sidecar is built directly into the application by the developer, as put together by the developer through a standardized Continuous Integration/Continuous Delivery (CI/CD) pipeline. In certain embodiments, the sidecar functionality runs in the security enclave. Once deployed, the sidecar functionality may be untouchable by the developer yet controlled by security personnel. By bolting the sidecar directly into the application, a friction point is removed for service meshes, and existing applications can use the built-in sidecar and Istio principles. In certain embodiments described herein, security personnel control the service mesh, regardless of the configuration. In some embodiments, development has limited to no trouble deploying a service mesh. In certain embodiments, operating the service mesh is frictionless.

Certain embodiments described herein integrate connection management into and application and replace existing agent technology with agentless technology. Certain embodiments described herein allow security personnel and a developer to manage and control the same application networking components. Certain embodiments of this disclosure provide sidecar functionality for green and/or brown field deployments, as well as support for in-browser deployments.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 1:
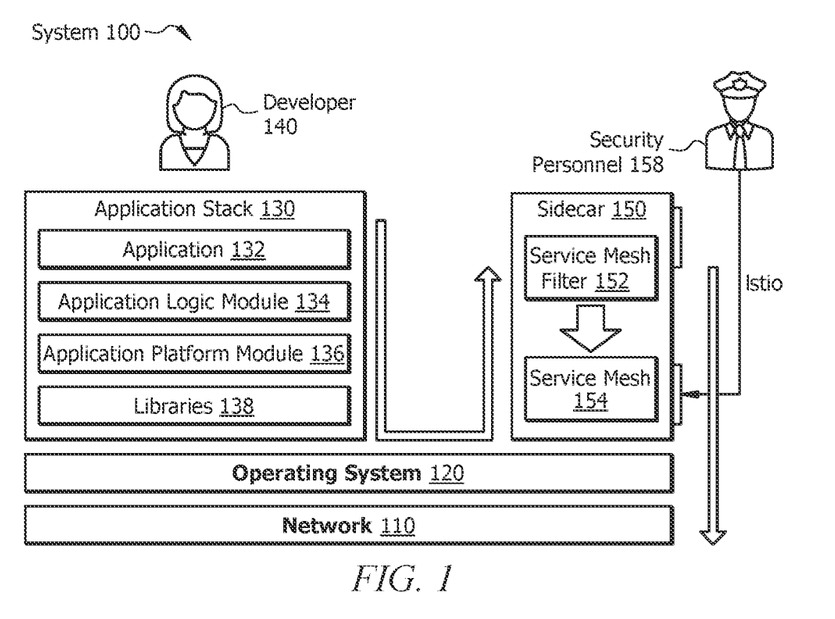
FIG. 1 illustrates a system for an application using sidecar functionality, in accordance with certain embodiments.

This disclosure describes systems and methods for a WASM-based service mesh. FIG. 1 illustrates a system 100 for an application 132 using sidecar functionality, in accordance with certain embodiments. System 100 or portions thereof may be associated with an entity, which may include any entity, such as a business, company, or enterprise, that uses applications with sidecar functionality. The components of system 100 may include any combination of hardware, firmware, and software. For example, the components of system 100 may use one or more elements of the computer system of FIG. 5. In the illustrated embodiment of FIG. 1, system 100 includes a network 110, an operating system 120, an application stack 130, application 132, an application logic module 134, an application platform module 136, libraries 138, a developer 140, a sidecar 150, a service mesh filter 152, a service mesh 154, and security personnel 158.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined WAN (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a Wi-Fi network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more physical devices, virtual machines, bare metal servers, and the like. As another example, nodes may include data communications equipment such as computers, routers, servers, printers, devices, workstations, switches, bridges, modems, hubs, and the like.

Operating system 120 of system 100 represents system software that manages computer hardware and software resources. In certain embodiments, operating system 120 provides common services for computer programs. In some embodiments, operating system 120 acts as an intermediary between programs and the computer hardware. Types of operating systems 120 include Linux (e.g., Red Hat, Ubuntu, TinyCore, Clear Linux, RancherOS, etc.), Microsoft Windows, macOS by Apple Inc., Android, and the like.

Application stack 130 of system 100 represents a collection of independent modules that work together to support the execution of application 132. Application stack 130 may be relative to the entity that uses application 132. For example, application stack 130 for an enterprise level may include one or more of the following features: email, instant messaging, word processing, spreadsheets, database access, etc. In the illustrated embodiment of FIG. 1, application stack 130 includes application 132, application logic module 134, application platform module 136, and libraries 138.

In some embodiments, application stack 130 is hosted on operating system 120. Operating system 120 (e.g., a Linux operating system) may provide application 132 with threads/processes, scheduling functions, memory management functions, communication functions, network functions, a combination thereof, etc. In certain embodiments, operating system 120 uses an embedded networking stack and networking hardware to send and/or receive messages from other application processes hosted on different machines (e.g., computers, personal electronic devices, clients, and multi-functional devices, etc.). In some embodiments, operating system 120 uses inter-process communication techniques to allow communication between processes on the same computer.

Application 132 of system 100 represents one or more computer programs designed to implement one or more specific tasks. Application 132 may represent a web application and/or a native application. Application 132 may include word processing software, graphics software, spreadsheet software, accounting software, data management software, documentation software, enterprise resource planning, financial software, field service management software, project management software, entertainment software, educational software, enterprise infrastructure software, presentation software, web browsers, or any other suitable types of application software.

Application logic module 134 of system 100 includes code (e.g., application logic) that implements rules within application 132. In certain embodiments, application logic module 134 includes rules and/or processes that control how a user interacts with data. Application logic of application logic module 134 may be written in one or more high-level programming languages (e.g., C++, Java, Python, etc.).

Application platform module 136 of system 100 represents a framework of services that application 132 relies on for standard operations. Application platform module 136 may include one or more development tools, execution services, data services, operating systems, cloud services, a combination thereof, and the like. In certain embodiments, application platform module 136 provides the runtime environment for application logic module 134. Application platform module 136 may manage the life cycle of application 132. In some embodiments, application platform module 136 ensures the availability, reliability, security, monitoring, and/or scalability of application logic module 134. Application platform module 136 may include a Java platform (e.g., Java virtual machine (JVM)), a Python platform (e.g., a Python interpreter), and the like.

In certain embodiments, application logic module 134 runs on application platform module 136 (e.g., JVM, Python interpreter, etc.). If application 132 is completely compiled in native assembly, application platform module 136 may be non-existent. For example, application 132 may be combined with a set of libraries 138 that provide a set of base functions for application 132.

Libraries 138 of system 100 represent collections of non-volatile resources used by computer programs. In certain embodiments, libraries 138 encapsulate operating system calls, handle encryption functions, manage Hypertext Transfer Protocol (HTTP) requests, and/or the like. In some embodiments, libraries 138 are used for software development. In some embodiments, one or more libraries 138 are used to develop application 132. Libraries 138 may include configuration data, documentation, help data, message templates, pre-written code, classes, subroutines, values, specifications, and the like. Libraries 138 may include native libraries, legacy libraries, or any other suitable types of libraries.

Developer 140 of system 100 represents an individual or group of individuals who build and/or create software and/or applications. For example, developer 140 may write, debug, and/or execute the source code of application 132. In certain embodiments, developer 140 compiles application 132. For example, developer 140 may write application logic for application 132 (e.g., an enterprise application).

In system 100 of FIG. 1, application 132 is accompanied by an external helper, sidecar 150. Sidecar 150 of system 100 represents a separate container that runs alongside an application container (e.g., application stack 130) in a pod (e.g., a Kubernetes pod). In certain embodiments, the configuration of sidecar 150 mediates inbound and/or outbound communication to the workload instance it is attached to.

In certain embodiments, sidecar 150 handles the networking of application 132. For example, the network routes of application 132 may first point to the sidecar 150. The reason this is built this way is that sidecar 150 can address the security functions that need to run in isolation (e.g., keeping key material for secured connection and for performing encryption functionality using the key material). Memory segmentation can be maintained between legacy application 132 and sidecar 150. The process-construct in the operating system kernel itself enforces memory separation. Using the construct of sidecar 150, it becomes the responsibility of security personnel 158 to manage the network security aspects of application 132. The role of developer 140 is to manage application stack 130. This results in a clear separation between roles and responsibilities.

Security personnel 158 of system 100 represents an individual or group of individuals who protect the usability and/or integrity of certain aspects of network 110. Security personnel 158 may be associated with a different entity than that of developer 140. For example, security personnel 158 may be associated with a service provider (e.g., Amazon Web Services (AWS), Microsoft Azure, etc.), while developer may belong to a customer of the service provider (e.g., Cisco, AT&T, etc.).

Service mesh filter 152 of system 100 represents a mechanism to customize service mesh 154. For example, service mesh filter 152 may be used to modify values for certain fields, add specific filters, add new listeners, add new clusters, and the like. Service mesh filter 152 may include one or more EnvoyFilters or any other suitable types of service mesh filters.

Service mesh 154 of system 100 represents a dedicated infrastructure layer that can be added to application 132. Service mesh 154 allows developer 140 and/or security personnel 158 to transparently add capabilities such as observability, traffic management, and/or security without adding them to the code of application 132. In certain embodiments, service mesh 154 refers to both the type of software used to implement this pattern and the security or network domain that is created when that software is used. Service mesh 154 may be used to abstract network 110 from the core business logic. In certain embodiments, service mesh 154 provides load balancing features, resiliency features (e.g., timeouts, circuit breakers, observability, retries, metrics, etc.) and the like.

In some embodiments, service mesh 154 is associated with an Istio service mesh, which is an open-source service mesh that layers transparently onto existing distributed applications. An Istio service mesh is logically split into a data plane and a control plane. The data plane is composed of a set of intelligent proxies (Envoy) deployed as sidecars 150. These proxies may mediate and/or control network communication between microservices.

In the illustrated embodiment of FIG. 1, service mesh 154 is run as sidecar 150 next one or more services in application 132. In certain embodiments, Istio programs sidecar 150 in service mesh 154 with the necessary configuration required to reach every workload instance in service mesh 154. In some embodiments, sidecar 150 is programmed to accept traffic on the ports associated with the workload.

In certain embodiments, when Istio/Envoy is deployed, sidecar 150 is started on a computer with operating system 120. Sidecar 150 may manage communication of managed application processes hosted on the machine. In some embodiments, sidecar 150 provides for a visibility and/or enforcement point for security personnel 158. For example, sidecar 150 may provide for a visibility and/or enforcement point by way of an Istio control plane. Control plane traffic in Istio refers to configuration and control messages sent between Istio components to program the behavior of service mesh 154.

In certain embodiments, sidecar 150 runs separated from the main processes, and memory is not shared between the processes. This separation creates a boundary between those functions that need to run in isolation. To communicate between the processes, the inter-process communications mechanisms of operating system 120 are needed to send/receive packets (e.g., Internet Protocol (IP) packets) between the application processes, sidecar 150, and the network hardware. Plugins (e.g., WASM plugins) may be used by sidecar 150 to enforce specific networking policies, per the standard Istio/Envoy deployments. In the illustrated embodiment of FIG. 1, developer 140 compiles and runs application 132, and security personnel 158 manage sidecar 150 and the required enforcement policies.

The arrows in FIG. 1 indicate packet flows through system 100. While FIG. 1 illustrates the unidirectional flow, the reverse flow is equally applicable. For example, an HTTP message may be formulated by application logic module 134 using libraries 138 embedded in application 132, ciphered with a Secure Sockets Layer (SSL) library, and sent to network 110. In certain embodiments, Istio/Envoy ensures that the packets are first directed to sidecar 150, which can then decrypt the flow, analyze the flow, re-encrypt, and/or send the HTTP message across network 110 and through the networking stack of operating system 120 and the networking hardware. Similarly, received packets may be first directed to sidecar 150 by operating system 120, decrypted, inspected, re-encrypted, and/or forwarded to the application process.

Service mesh 154 allows security personnel 158 to control connection management from applications as these are deployed on-premises and/or in cloud systems. When application 132 is extended with sidecar 150, the traffic for application 132 is first routed to sidecar 150, and sidecar 150 can then establish secure connections (e.g., Mutual Transport Layer Security (mTLS) connections) to the target, manage certificates, enforce connection security policies, manage higher level application programming interface (API) constructs (e.g., API-runtime application self-protection (RASP) (API-RASP)), etc. In certain embodiments, sidecar 150 is managed by security personnel 158 while application 132 is managed by developer 140. An alternate method for building sidecar solutions is by bolting the sidecar functionality directly in application stack 130, as illustrated below in FIG. 2.

Although FIG. 1 illustrates a particular number of networks 110, operating systems 120, application stacks 130, applications 132, application logic modules 134, application platform modules 136, libraries 138, developers 140, sidecars 150, service mesh filters 152, service meshes 154, and security personnel 158, this disclosure contemplates any suitable number of networks 110, operating systems 120, application stacks 130, applications 132, application logic modules 134, application platform modules 136, libraries 138, developers 140, sidecars 150, service mesh filters 152, service meshes 154, and security personnel 158.

Although FIG. 1 illustrates a particular arrangement of network 110, operating system 120, application stack 130, application 132, application logic module 134, application platform module 136, libraries 138, developer 140, sidecar 150, service mesh filter 152, service mesh 154, and security personnel 158, this disclosure contemplates any suitable arrangement of network 110, operating system 120, application stack 130, application 132, application logic module 134, application platform module 136, libraries 138, developer 140, sidecar 150, service mesh filter 152, service mesh 154, and security personnel 158. For example, certain embodiments of this disclosure may not include application platform module 136 in application stack 130.

Furthermore, although FIG. 1 describes and illustrates particular components, devices, or systems carrying out particular actions, this disclosure contemplates any suitable combination of any suitable components, devices, or systems carrying out any suitable actions.

Figure 2:
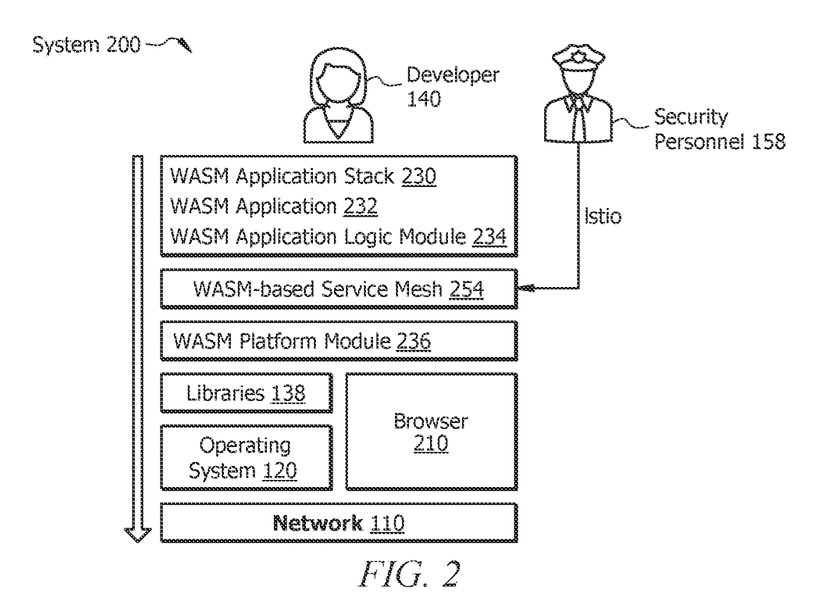
FIG. 2 illustrates a system for a WASM-based service mesh, in accordance with certain embodiments.

FIG. 2 illustrates a system 200 for a native WASM-based deployment of a WASM-based service mesh 254, in accordance with certain embodiments. The sidecar functionality of FIG. 1 is often difficult to deploy reliably, and users (e.g., customers) may find the use of such sidecars cumbersome. The user also needs be in a position to run the sidecar and Kubernetes. When the sidecar technology is rolled out, deployments often require handholding as configuration issues of the sidecar can be expansive. It is not uncommon for the deployments fail because of configuration issues. For example, version differences between the Istio control plane and deployed sidecars may create deployment difficulties, extensions to the sidecar, configuration problems for customers, and the like.

System 200 of FIG. 2 bolts the sidecar functionality of FIG. 1 directly in application stack 130, which may address one or more of the issues described above. However, when the sidecar is part of application stack 130, there is no memory protection inside application stack 130, and adversaries can disrupt the operation of the sidecar by reading and writing the sidecar data structures that are used by application 132. This means that security keys, session keys, and/or security policies that need to be executed by the sidecar are available for inspection and change. This may defeat the point of the sidecar, which is to be the application's trust point for security. Moreover, as the sidecar is processing some security data unencrypted (e.g., keys for accessing the Istio control plane), a thread running in application 132 may snoop on that data and siphon it to external nefarious actors itself.

WASM is a new development technology where application components can interoperate with strong memory protection. One module cannot touch another module's memory. If the application (e.g., a Software as a service (or SaaS) application) is built completely using WASM, the sidecar functionality and the application functionality can be integrated in the application. Compiler-enforced memory segmentation allows the WASM-based application networking function to address all the security functions without needing to worry about leaking of security material. In such cases, the WASM-based networking function maintains the appropriate data structures for the ciphering operations, and the WASM compiler makes certain no other modules can access that data.

By organizing application networking directly into the application, the sidecar itself completely disappears while the functionality and the memory segregation remain. As such, a deployment bottleneck is addressed. In certain embodiments, the sidecar's controlling endpoint is implemented in this new form of application network technology through a command-and-control function inside the embedded functions (e.g., by way of a separate thread of control). The developer is responsible for putting together the application image, while security personnel are responsible for controlling the networking aspects of the application. As such, there is still the separation between roles and responsibilities between development and security while the machinery needed to implement the application (logic+networking) now uses a single process instead of two processes.

System 200 includes network 110, operating system 120, libraries 138, developer 140, security personnel 158, a WASM application stack 230, a WASM application 232, a WASM application logic module 234, a WASM platform 236, a WASM-based service mesh 254, and a browser 210. Network 110, operating system 120, libraries 138, developer 140, and security personnel 158 are described above in FIG. 1. WASM application stack 230 is similar to application stack 130 of FIG. 1, WASM application 232 is similar to application 132 of FIG. 1, WASM application logic module 234 is similar to application logic module 134 of FIG. 1, WASM platform module 236 is similar to application platform module 136 of FIG. 1, and WASM-based service mesh 254 is similar to service mesh 154 of FIG. 1, with the exceptions noted below. The functions of system 200 are similar to those presented for system 100 in FIG. 1, yet rather than managing the entire deployment through multiple independent processes, the sidecar functions are embedded into application stack 130.

In the illustrated embodiment of FIG. 2, developer 140 builds WASM application 232 by writing the application logic (e.g., the enterprise logic) and integrating the application logic with the other WASM-based components, a newly defined WASM-based service mesh 254, and WASM platform module 236 to enable the WASM components to run. In certain embodiments, WASM application stack 230 includes application libraries 138. WASM application stack 230 may be hosted on operating system 120.

In some embodiments, WASM application stack 230 includes browser 210. Browser 210 of system 100 represents an application for accessing websites. For example, browser 210 may retrieve files from a web server and display the page on the screen of a user. Examples of browser 210 include Google Chrome, Apple Safari, V8, Internet Explorer, Microsoft Edge, Mozilla Firefox, Opera, etc. If WASM application 232 runs as part of browser 210, browser 210 may be leveraged as an "operating system." In certain embodiments, system 200 uses networking stack of operating system 120 and networking hardware to send and receive network packets (e.g., IP packets).

In certain embodiments, browser 210 may host multiple WASM applications 232, each in their own virtual environments inside browser 210. By crafting WASM-based service mesh 254, each tab can be part of its own mesh. Given that browser 210 is in essence "just another application process," browser 210 may communicate with other hosts or processes on the same hosts through operating system 120.

In the illustrated embodiment of FIG. 2, the sidecar functionality is embedded directly in the application image itself. When WASM application 232 is run, WASM-based service mesh 254 is automatically part of the running process as well. The WASM mechanisms are used to separate memory regions between the components such that the secrets needed for WASM-based service mesh 254 are successfully hidden from other WASM modules. In certain embodiments, WASM-based service mesh 254 can initiate its own command-and-control center to enable remote control of the function. Thus, on first activation of WASM-based service mesh 254, an internal process or "thread of control" is started in WASM-based service mesh 254 that connects into the control plane (e.g., the Istio control plane). This thread may then be managed by security personnel 158 to handle the security aspects of WASM application 232. This thread enables security personnel 158 to install enforcement policies for WASM application 232 directly.

The arrows in FIG. 2 show the packet flow in one direction. As shown, the packets are sent directly from WASM application logic module 234 into embedded WASM-based service mesh 254. No inter-process communication between WASM application stack 230 and a sidecar is needed as the sidecar functionality is already part of WASM application 232. This saves the inter-process communication delays when sending and/or receiving packets, saves a decrypt/re-encrypt cycle, and no man-in-the-middle functions are needed to enable sidecar to decrypt messages.

Although FIG. 2 illustrates a particular number of networks 110, operating systems 120, libraries 138, developers 140, security personnel 158, browsers 210, WASM application stacks 230, WASM applications 232, WASM application logic modules 234, WASM platform modules 236, and WASM-based service meshes 238, and this disclosure contemplates any suitable number of networks 110, operating systems 120, libraries 138, developers 140, security personnel 158, browsers 210, WASM application stacks 230, WASM applications 232, WASM application logic modules 234, WASM platform modules 236, and WASM-based service meshes 238.

Although FIG. 2 illustrates a particular arrangement of network 110, operating system 120, libraries 138, developer 140, security personnel 158, browser 210, WASM application stack 230, WASM application 232, WASM application logic module 234, WASM platform module 236, and WASM-based service mesh 254, this disclosure contemplates any suitable arrangement of network 110, operating system 120, libraries 138, developer 140, security personnel 158, browser 210, WASM application stack 230, WASM application 232, WASM application logic module 234, WASM platform module 236, and WASM-based service mesh 254.

Furthermore, although FIG. 2 describes and illustrates particular components, devices, or systems carrying out particular actions, this disclosure contemplates any suitable combination of any suitable components, devices, or systems carrying out any suitable actions.

Figure 3:
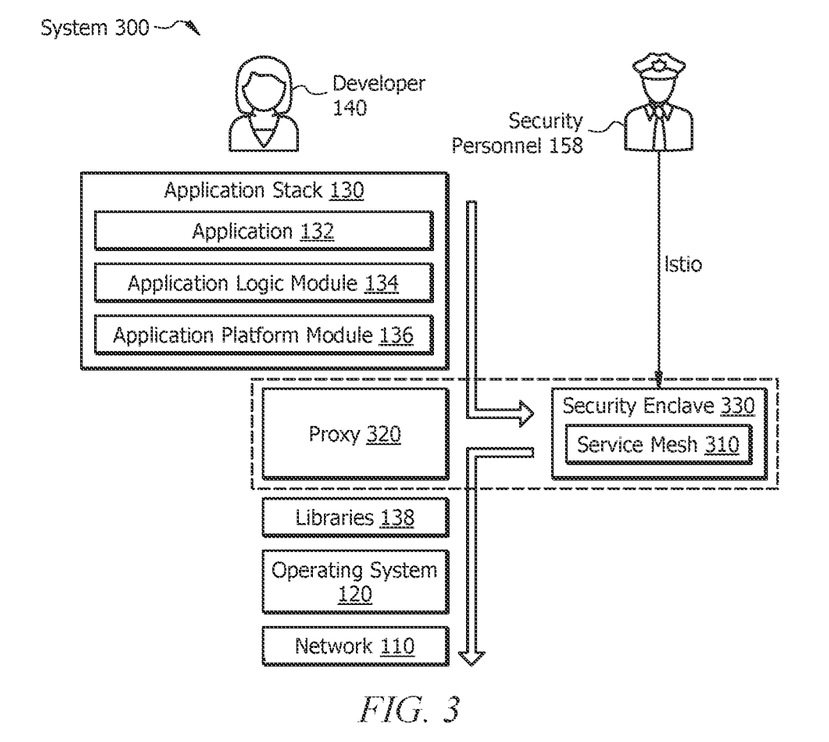
FIG. 3 illustrates a system for combining a service mesh and a security enclave, in accordance with certain embodiments.

FIG. 3 illustrates a system 300 for combining a service mesh 310 and a security enclave 330, in accordance with certain embodiments. As described in FIG. 2 above, WASM ensures memory segregation between the individual WASM components of WASM application 232. However, it is not straightforward to use the same techniques for deploying in-application networking functions akin to a sidecar in legacy applications. In certain embodiments, legacy applications are built from a set of application logic, run-time system, and/or a set of libraries that operate from the same address space. One or more components may share the same memory heap such that and one module can read/write another module's memory. When a WASM application networking component is integrated with a legacy application, the legacy application may read and write the application's WASM-based networking functions, and thus read and write ciphering key material and otherwise disrupt secure application networking. In other words, the strict separation may not exist anymore, and security may not operate in isolation.

If legacy libraries are part of a WASM application and those applications are compromised through known and/or unknown vulnerabilities, the secrets embedded in the WASM-based service mesh may be at risk. One or more approaches may be taken to mitigate this threat. One approach is to build the entire application with WASM functions, without any legacy component. Another approach is to scan the application libraries beforehand for such vulnerabilities. Yet another approach is to run service mesh 310 in security enclave 330, as illustrated in system 300.

System 300 of FIG. 3 includes network 110, operating system 120, application stack 130, application 132, application logic module 134, application platform module 136, libraries 138, developer 140, security personnel 158, a service mesh 310, a proxy 320, and a security enclave 330. Network 110, operating system 120, application stack 130, application 132, application logic module 134, application platform module 136, libraries 138, developer 140, security personnel 158, are described above in FIG. 1.

Service mesh 310 of system 300 represents a tool for controlling the interactions between applications 132. Service mesh 310 is hosted inside security enclave 330. In certain embodiments, service mesh 310 inserts proxy 320 next to individual applications and intercepts the traffic to and/or from that application instance. Proxy 320 represents software that acts as an intermediary between applications 132. For example, proxy 320 may intercepts communication between applications 132 in service mesh 310. In certain embodiments, proxy 320 serves as the data plane and determines the features, functionality, and/or performance of service mesh 310. In some embodiments, proxy 320 shapes the control plane for service mesh 310. The control plane provides administrators with a user interface and is responsible for providing command and control to the data plane. In some embodiments, proxy 320 makes up the data plane and/or receives command and control signals, policies, and/or instructions from a separate control plane. Service mesh 310 may be WASM or non-WASM based.

In certain embodiments, service mesh 310 provides security safeguards such as encrypting traffic between applications 132, ensuring identity, handling policy, authentication, and authorization, and the like. In some embodiments, service mesh 310 provides reliability safeguards such as increasing the reliability of interactions between applications 132, accounting for network and application failures, improving on built-in Kubernetes constructs, and the like. In certain embodiments, service mesh 310 provides observability features such as providing insight into the performance of applications 132, simplifying the availability of metrics about the interactions of applications 132, providing maps into the communications of applications 132, and the like.

Security enclave 330 represents a trusted execution environment in a secure area of a main processor. In certain embodiments, security enclave 330 guarantees code and/or data loaded inside is protected with respect to confidentiality and/or integrity. For example, data integrity may prevent unauthorized entities from outside security enclave 330 from altering data. As another example, code integrity may prevent code in security enclave 330 from being replaced or modified by unauthorized entities.

In certain embodiments, security enclave 330 implements one or more of the following hardware technologies: ARM (TrustZone, Realm Management Extension/Confidential Compute Architecture (CCA), etc.); Intel (Trusted Execution Technology, SGX Software Guard Extensions, "Silent Lake", etc.); AMD (e.g., Platform Security Processor (PSP), AMD Secure Encrypted Virtualization and the Secure Nested Paging extension, etc.); IBM (IBM Secure Service Container, IBM Secure Execution, etc.); RISC-V (Multi-Zone Security Trusted Execution Environment, Keystone Customizable TEE Framework, Penglai Scalable TEE for RISC-V, etc.); etc.

In the illustrated embodiment of FIG. 3, one or more security enclaves 330 are used as a mechanism to enforce memory segregation. As such, the benefits of a single application image can be realized. Security enclave 330 of a processor allows for a processing environment where the processor only runs pre-approved and signed images (e.g., components) and/or enforces strict memory segregation between the enclave and its regular process. In other words, when part of application 132 runs inside security enclave 330, "normal" memory may be accessed, but not the other way around. Hosting one or more service meshes 310 inside security enclave 330, while the rest of application 132 is hosted as a "regular" process on the processor, allows for the strict segregation of memory needed for the security function, while retaining the "single process" paradigm.

In the illustrated embodiment of FIG. 3, application 132 is linked into a single image. Service mesh 310 is targeted to security enclave 330 and proxy 320 is inserted into the image of application 132 to facilitate the appropriate system calls to enter and/or exit security enclave 330 and/or to exchange messages between the process in normal mode and/or secured mode. Separately, a command-and-control center may be introduced, as before, in security enclave 330 by starting a thread of control that purely runs from security enclave 330. Thus, when an application message is to be sent, the message is made available to security enclave 330, and the message is then processed inside security enclave 330 and readied for transmission. As before, service mesh 310 applies its functionality on the message, encrypts the data, and/or forwards it to the operating system's networking stack for delivery into network 110 or target process. If enforcement actions are needed, the messages may be discarded and/or changed inside security enclave 330. In the illustrated embodiment of FIG. 3, this enforcement point is controlled by security personnel 158.

In certain embodiments, to use service mesh 310 of security enclave 330, existing applications 132 may need to be re-linked with libraries 138 (e.g., new shared libraries and/or static libraries). This allows existing application 132 to benefit from the innovation without requiring application 132 to be refactored into WASM. The functionality that is hosted inside security enclave 330 may be based on WASM-based technology or regular application development processes.

In certain embodiments, the insertion point of service mesh 310 into application stack 130 is the SSL library interface. Application 132 may provide an unencrypted packet to security enclave 330. The code inside security enclave 330 policies the packet, encrypts the packet, and/or hands the packet back to the process operating in normal processing mode. Similarly, for receiving encrypted packets from network 110, the packet may first be decrypted, then policied before the unencrypted packet is made available to the process running in normal mode.

Although FIG. 3 illustrates a particular number of networks 110, operating systems 120, application stacks 130, applications 132, application logic modules 134, application platform modules 136, libraries 138, developers 140, security personnel 158, service meshes 310, proxies 320, and security enclaves 330, this disclosure contemplates any suitable number of networks 110, operating systems 120, application stacks 130, applications 132, application logic module 134, application platform modules 136, libraries 138, developers 140, security personnel 158, service meshes 310, proxies 320, and security enclaves 330.

Although FIG. 3 illustrates a particular arrangement of network 110, operating system 120, application stack 130, application 132, application logic module 134, application platform module 136, libraries 138, developer 140, security personnel 158, service mesh 310, proxy 320, and security enclave 330, this disclosure contemplates any suitable arrangement of network 110, operating system 120, application stack 130, application 132, application logic module 134, application platform module 136, libraries 138, developer 140, security personnel 158, service mesh 310, proxy 320, and security enclave 330.

Furthermore, although FIG. 3 describes and illustrates particular components, devices, or systems carrying out particular actions, this disclosure contemplates any suitable combination of any suitable components, devices, or systems carrying out any suitable actions.

Figure 4:
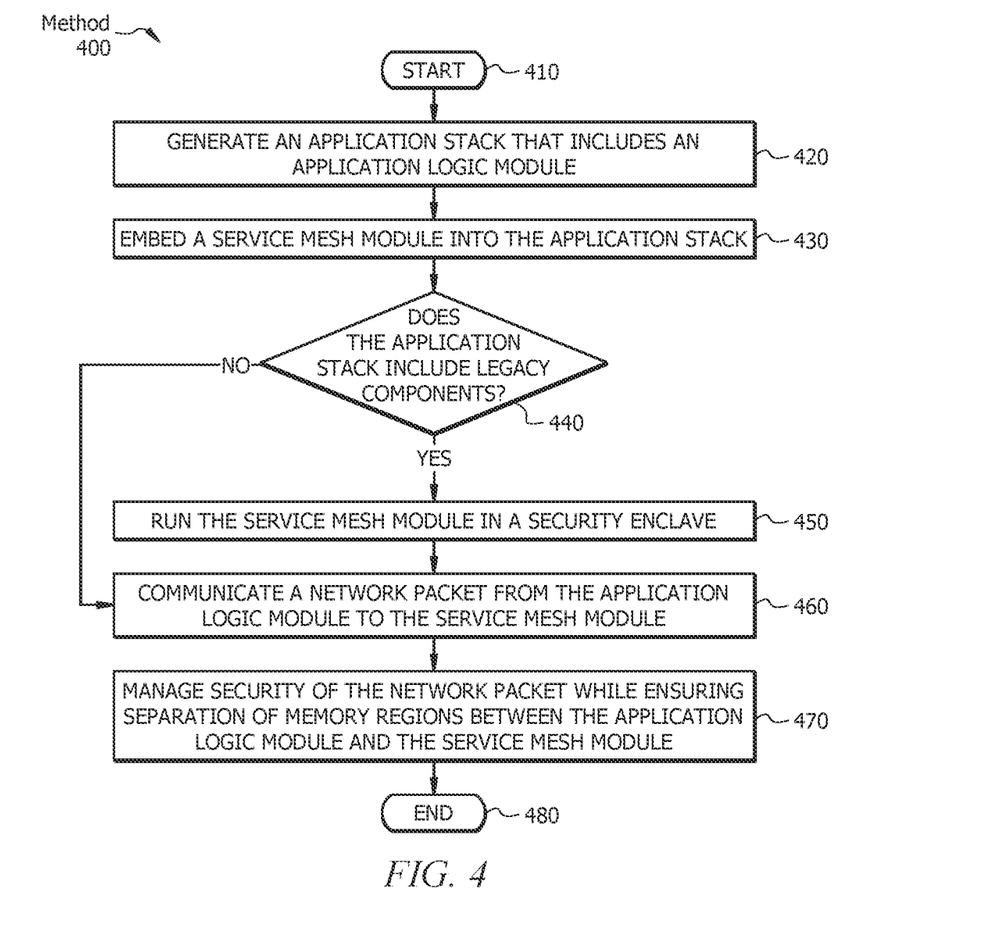
FIG. 4 illustrates a method for embedding a service mesh into an application, in accordance with certain embodiments.

FIG. 4 shows a method 400 for embedding a service mesh into an application, in accordance with certain embodiments. Method 400 of FIG. 4 starts at step 410. At step 420, an application stack is generated that includes an application logic module. For example, referring to FIG. 2, developer 140 may generate WASM application stack 230 with WASM application logic module 234. In certain embodiments, the application stack may include additional modules such as a platform module (e.g., WASM platform module 236 of FIG. 2), one or more libraries (e.g., libraries 138 of FIG. 2), and the like. Method 400 then moves from step 420 to step 430.

At step 430 of method 400, a service mesh module is embedded into the application stack. For example, referring to FIG. 2, WASM-based service mesh 254 may be embedded into WASM application stack 230 using Istio. When the application of the application stack is run, the embedded service mesh is automatically part of the running process as well. In certain embodiments, WASM mechanisms are used to separate memory regions between the components such that the secrets needed for the service mesh are successfully hidden from other WASM modules. The service mesh may initiate its own command-and-control center to enable remote control of the function. On first activation of the service mesh, an internal process or "thread of control" may be started in the service mesh that connects into the control plane (e.g., the Istio control plane). This thread may then be managed by security personnel to handle the security aspects of the application. Method 400 then moves from step 430 to step 440.

At step 440 of method 400, a determination is made as to whether the application stack includes legacy components. If legacy components (e.g., legacy libraries) are part of a WASM-based application and those applications are compromised through known and/or unknown vulnerabilities, the secrets embedded in the service mesh may be at risk. If the application stack does include legacy components, method 400 moves from step 440 to step 450, where the service mesh is run in a security enclave. For example, referring to FIG. 3, service mesh 310 may be run in security enclave 330. The security enclave represents a trusted execution environment in a secure area of a main processor. The security enclave may guarantee that code and/or data loaded inside the security enclave is protected with respect to confidentiality and/or integrity. In certain embodiments, the security enclave is used as a mechanism to enforce memory segregation. As such, the benefits of a single application image can be realized. The security enclave may use Arm's TrustZone, Intel's SGX, or any other suitable technology. Method 400 then moves from step 450 to step 460. If, at step 440, the application stack does not include legacy components, method 400 advances from step 440 to step 460.

At step 460 of method 400, a network packet is communicated from the application logic module to the service mesh module. For example, referring to FIG. 2, a network packet may be communicated from WASM application logic module 234 to WASM-based service mesh 254. As another example, referring to FIG. 3, a network packet may be communicated from application logic module 134 to service mesh 310 in security enclave 330 via proxy 320. Method 400 then moves from step 460 to step 470, At step 470 of method 400, the service mesh manages the security of the network packet while ensuring separation of memory regions between the application logic module and the service mesh module. For example, referring to FIG. 2, WASM-based service mesh 254 may manage the security of the network packet while ensuring separation of memory regions between WASM application logic module 234 and WASM-based service mesh 254. As another example, referring to FIG. 3, service mesh 310 running in security enclave 330 may manage the security of the network packet while ensuring separation of memory regions between application logic module 134 and service mesh 310. Method 400 then moves from step 470 to step 480, where method 400 ends.

Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates an example method for embedding a service mesh into an application including the particular steps of the method of FIG. 4, this disclosure contemplates any suitable method for embedding a service mesh into an application including any suitable steps, which may include all, some, or none of the steps of the method of FIG. 4, where appropriate. Although FIG. 4 describes and illustrates particular components, devices, or systems carrying out particular actions, this disclosure contemplates any suitable combination of any suitable components, devices, or systems carrying out any suitable actions.

Figure 5:
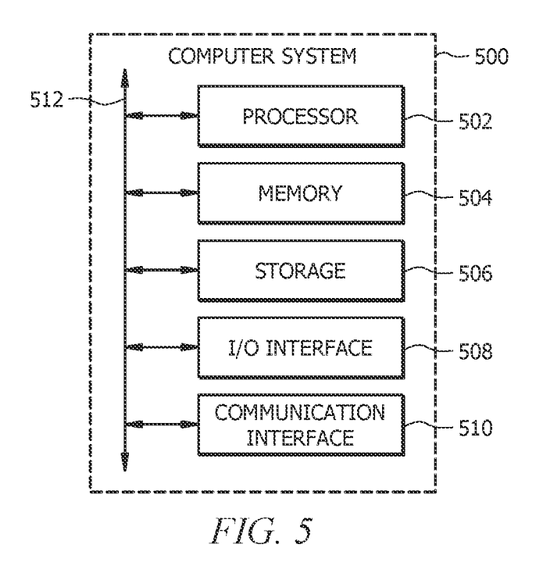
FIG. 5 illustrates a computer system that may be used by the systems and methods described herein, in accordance with certain embodiments.

FIG. 5 illustrates an example computer system 500. In particular embodiments, one or more computer system 500 perform one or more steps of one or more methods described or illustrated herein. In particular embodiments, one or more computer system 500 provide functionality described or illustrated herein. In particular embodiments, software running on one or more computer system 500 performs one or more steps of one or more methods described or illustrated herein or provides functionality described or illustrated herein. Particular embodiments include one or more portions of one or more computer system 500. Herein, reference to a computer system may encompass a computing device, and vice versa, where appropriate. Moreover, reference to a computer system may encompass one or more computer systems, where appropriate.

This disclosure contemplates any suitable number of computer system 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer system 500; be unitary or distributed; span multiple locations; span multiple machines; span multiple data centers; or reside in a cloud, which may include one or more cloud components in one or more networks. Where appropriate, one or more computer system 500 may perform without substantial spatial or temporal limitation one or more steps of one or more methods described or illustrated herein. As an example and not by way of limitation, one or more computer system 500 may perform in real time or in batch mode one or more steps of one or more methods described or illustrated herein. One or more computer system 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer system 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
one or more processors; and
one or more computer-readable non-transitory storage media coupled to the one or more processors and comprising instructions that, when executed by the one or more processors, cause the one or more processors to perform operations comprising:
generating an application stack, wherein the application stack comprises an application logic module that includes application code;
embedding a service mesh module into the application stack, wherein the service mesh module adds security capabilities to the application stack that are separate from the application code; and
managing, by the service mesh module, security of a network packet while maintaining separation of memory regions between the application logic module and the service mesh module.

2. The system of claim 1, wherein:
the application stack further comprises an application platform module; and
the application platform module, the application logic module, and the service mesh module are WebAssembly (WASM)-based modules.

3. The system of claim 1, wherein:
the application stack further comprises legacy libraries; and
the service mesh module is run in a security enclave.

4. The system of claim 1, the operations further comprising initiating, by the service mesh module, a command-and-control center to activate an internal process that connects into a control plane.

5. The system of claim 1, wherein:
the application logic module is managed by a developer;

the service mesh module is managed by security personnel; and the developer and the security personnel are associated with different entities.

6. The system of claim 1, wherein the application stack is hosted on an operating system.

7. The system of claim 6, wherein a browser is leveraged as the operating system.

8. A method, comprising:

generating an application stack, wherein the application stack comprises an application logic module that includes application code;

embedding a service mesh module into the application stack, wherein the service mesh module adds security capabilities to the application stack that are separate from the application code; and managing, by the service mesh module, security of a network packet while maintaining separation of memory regions between the application logic module and the service mesh module.

9. The method of claim 8, wherein:

the application stack further comprises an application platform module; and the application platform module, the application logic module, and the service mesh module are WebAssembly (WASM)-based modules.

10. The method of claim 8, wherein:

the application stack further comprises legacy libraries; and the service mesh module is run in a security enclave.

11. The method of claim 8, further comprising initiating, by the service mesh module, a command-and-control center to activate an internal process that connects into a control plane.

12. The method of claim 8, wherein:

the application logic module is managed by a developer;

the service mesh module is managed by security personnel and the developer and the security personnel are associated with different entities.

13. The method of claim 8, wherein the application stack is hosted on an operating system.

14. The method of claim 13, wherein a browser is leveraged as the operating system.

15. One or more computer-readable non-transitory storage media embodying instructions that, when executed by a processor, cause the processor to perform operations comprising:

generating an application stack, wherein the application stack comprises an application logic module that includes application code;

embedding a service mesh module into the application stack, wherein the service mesh module adds security capabilities to the application stack that are separate from the application code; and managing, by the service mesh module, security of a network packet while maintaining separation of memory regions between the application logic module and the service mesh module.

16. The one or more computer-readable non-transitory storage media of claim 15, wherein:

the application stack further comprises an application platform module; and the application platform module, the application logic module, and the service mesh module are WebAssembly (WASM)-based modules.

17. The one or more computer-readable non-transitory storage media of claim 15, wherein:

the application stack further comprises legacy libraries; and the service mesh module is run in a security enclave.

18. The one or more computer-readable non-transitory storage media of claim 15, further comprising initiating, by the service mesh module, a command-and-control center to activate an internal process that connects into a control plane.

19. The one or more computer-readable non-transitory storage media of claim 15, wherein:

the application logic module is managed by a developer;

the service mesh module is managed by security personnel; and the developer and the security personnel are associated with different entities.

20. The one or more computer-readable non-transitory storage media of claim 15, wherein the application stack is hosted on an operating system.

* * * * *